(12) United States Patent
McGrew

(10) Patent No.: US 7,493,331 B2
(45) Date of Patent: Feb. 17, 2009

(54) AVOIDING SERVER STORAGE OF CLIENT STATE

(75) Inventor: David A. McGrew, Poolesville, MD (US)

(73) Assignee: Cisco Technology, Inc., San Jose, CA (US)

( * ) Notice: Subject to any disclaimer, the term of this patent is extended or adjusted under 35 U.S.C. 154(b) by 40 days.

(21) Appl. No.: 11/726,671

(22) Filed: Mar. 21, 2007

(65) Prior Publication Data

US 2007/0198829 A1 Aug. 23, 2007

Related U.S. Application Data

(63) Continuation of application No. 10/756,633, filed on Jan. 12, 2004, now Pat. No. 7,373,502.

(51) Int. Cl.
*G06F 7/00* (2006.01)

(52) U.S. Cl. .................. 707/101; 707/10; 707/102

(58) Field of Classification Search .............. 713/170; 707/10, 102, 101
See application file for complete search history.

(56) References Cited

U.S. PATENT DOCUMENTS

| | | | |
|---|---|---|---|
| 5,268,962 A | 12/1993 | Abadi et al. | |
| 5,961,601 A | 10/1999 | Iyehgar | |
| 6,134,592 A | 10/2000 | Montulli | |
| 6,253,326 B1 | 6/2001 | Lincke et al. | |
| 6,496,932 B1 | 12/2002 | Trieger | |
| 2005/0154873 A1 | 7/2005 | Cam-Winger et al. | |

OTHER PUBLICATIONS

Performance enhancement using intra-server caching in a continuous media server; Srinilta, C.; Choudhary, A.; Research Issues In Data Engineering, 1998. Continuous-Media Databases and Applications. Proceedings. Eighth International Workshop on Feb. 23-24, 1998 pp. 60-66.*

Write caching in distributed file systems Kerhong Chen; Bunt, R.B.; Eager, D.L.; Distributed Computing Systems, 1995., Proceedings of the 15th International Conference on May 30-Jun. 2, 1995 pp. 457-466.*

(Continued)

*Primary Examiner*—David Y Jung
(74) *Attorney, Agent, or Firm*—Hickman Palermo Truong & Becker LLP

(57) ABSTRACT

A method is disclosed for avoiding the storage of client state on a server. Based on a local key that is not known to a client, a server encrypts the client's state information. The client's state information may include, for example, the client's authentication credentials, the client's authorization characteristics, and a shared secret key that the server can use to encrypt and authenticate communication to and from the client. By any of a variety of mechanisms, the encrypted client state information is provided to the client. The server may free memory that stored the client's state information. When the server needs the client's state information, the client sends, to the server, the encrypted state information that the client stored. The server decrypts the client state information using the local key. Because each client stores that client's own state information in encrypted form, the server does not need to store any client's state information permanently.

30 Claims, 12 Drawing Sheets

OTHER PUBLICATIONS

Remote memory as a resource in distributed systems Narten, T.; Yavagkar, R.; Workstation Operating Systems, 1992. Proceedings., Third Workshop on Apr. 23-24, 1992 pp. 132-136.*

J. Salowey et al., "Transport Layer Security (TLS) Session Resumption without Server-Side State," IETF Request for Comments (RFC) 4507, May 2006, 16 pages.

N. Cam-Winget et al., "A TLS Hello Extension for Ticket Based Pre-Shared Keys," IETF Internet-Draft "draft-salowey-tls-ticket-00. txt," May 2004, 8 pages.

A. Pfitzmann et al., "Anonymity, Unlinkability, Unobservability, Pseudonymity, and Identity Management—A Consolidated Proposal for Terminology," Dresden University, Dec. 13, 2005, 48 pages.

H. Shacham et al., "Client Side Caching for TLS," Proceedings of the Internet Society's 2002 Symposium on Network and Distributed System Security, 2002, 26 pages.

H. Krawczyk et al., "HMAC: Keyed-Hashing for Message Authentication," IETF RFC 2104, Feb. 1997, 11 pages.

A. Medvinsky et al., "Addition of Kerberos Cipher Suites to Transport Layer Security (TLS)," IETF RFC 2712, Oct. 1999, 7 pages.

D. Eastlake III et al., "Randomness Requirements for Security," IETF RFC 4086, Jun. 2005, 45 pages.

C. Neuman et al., "The Kerberos Network Authentication Service (V5)," IETF RFC 4120, Jul. 2005, 129 pages.

P. Eronen et al., "Pre-Shared Key Ciphersuites for Transport Layer Security (TLS)," IETF RFC 4279, Dec. 2005, 15 pages.

T. Aura et al., "Stateless connections," Helsinki Univ. Technology, 1997, 11 pg.

S. Blake-Wilson et al., "Transport Layer Security (TLS) Extensions," IETF RFC 2246, Jun. 2003, 24 pages.

N. Cam-Winget et al., "EAP Flexible Authentication via Secure Tunneling (EAP-FAST)," IETF Internet-draft "draft-cam-winget-eap-fast-00.txt," Feb. 9, 2004, 100 pg.

P. Gutmann, "Use of Shared Keys in the TLS Protocol," IETF Internet-draft "draft-ietf-tls-sharedkeys-01/02.txt," Apr. 2004, 7 pages.

P. Eronen et al., "Pre-Shared Key Ciphersuites for Transport Layer Security (TLS)," IETF internet-draft "draft-eronen-tls-psk-00.txt," Feb. 6, 2004, 9 pages.

T. Dierks et al., "The Transport Layer Security (TLS) Protocol Version 1.1," IETF RFC 4346, Apr. 2006, 71 pages.

S. Blake-Wilson et al., "Transport Layer Security (TLS) Extensions," IETF RFC 4366, Apr. 2006, 25 pages.

Anonymous, "Specification for the Advanced Encryption Standard (AES)," US Government FIPS Publication 197, Nov. 26, 2001, 51 pages.

Anonymous, "Secure Hash Standard," US Government FIPS Publication 180-2, Aug. 1, 2002, 75 pages.

S. Blake-Wilson et al., "Transport Layer Security (TLS) Extensions," IETF RFC 3546, Jun. 2003, 24 pages.

M. Dworkin, "Recommendation for Block Cipher Modes of Operation," US Government NIST Special Publication 800-38A, 2001, 66 pages.

International Searching Authority, "Notification of Transmittal of the International Search Report and the Written Opinion of the International Searching Authority, or the Declaration," PCT/US06/11479, dated May 1, 2007, 8 pages.

Baker, F. et al. RSVP Cryptographic Authentication, Network Working Group, RFC 2747, Jan. 2000, 20 pages.

Braden, R. et al., "Resource ReSerVation Protocol (RSVP)," Network Working Group, RFC 2205, Sep. 1997, 105 pages.

Herzog, S. et al., RSVP Extension for Policy Control, Network Working Group, RFC 2750, Jan. 2000, 13 pages.

Salowey, J., et al., "Transport Layer Security (TLS) Session Resumption without Server-Side State," IETF Request for Comments (RFC) 4507, May 2006, 16 pages.

Cam-Winget, N., et al., "A TLS Hello Extension for Ticket Based Pre-Shared Keys," IETF Internet-Draft "draft-salowey-tls-ticket-00. txt," May 2004, 8 pages.

Pfitzmann, A., et al., "Anonymity, Unlinkability, Unobservability, Pseudonymity, and Identity Management—A Consolidated Proposal for Terminology," Dresden University, Dec. 13, 2005, 48 pages.

Shacham, H., et al., "Client Side Caching for TLS," Proceedings of the Internet Society's 2002 Symposium on Network and Distributed System Security, 2002, 26 pages.

Krawczyk, H., et al., "HMAC: Keyed-Hashing for Message Authentication," IETF RFC 2104, Feb. 1997, 11 pages.

Medvinsky, A., et al., "Addition of Kerberos Cipher Suites to Transport Layer Security (TLS)," IETF RFC 2712, Oct. 1999, 7 pages.

Eastlake III, D., et al., "Randomness Requirements for Security," IETF RFC 4086, Jun. 2005, 45 pages.

Neuman, C., et al., "The Kerberos Network Authentication Service (V5)," IETF RFC 4120, Jul. 2005, 129 pages.

Eronen, P., et al., "Pre-Shared Key Ciphersuites for Transport Layer Security (TLS)," IETF RFC 4279, Dec. 2005, 15 pages.

Aura, T., et al., "Stateless connections," Helsinki Univ. Technology, 1997, 11 pg.

Blake-Wilson, S., et al., "Transport Layer Security (TLS) Extensions," IETF RFC 2246, Jun. 2003, 24 pages.

Cam-Winget, N., et al., "EAP Flexible Authentication via Secure Tunneling (EAP-FAST)," IETF Internet-draft "draft-cam-winget-eap-fast-00.txt," Feb. 9, 2004, 100 pg.

Gutmann, P., "Use of Shared Keys in the TLS Protocol," IETF Internet-draft "draft-ietf-tls-sharedkeys-01/02.txt," Apr. 2004, 7 pages.

Eronen, P., et al., "Pre-Shared Key Ciphersuites for Transport Layer Security (TLS)," IETF internet-draft "draft-eronen-tls-psk-00.txt," Feb. 6, 2004, 9 pages.

Dierks, T., et al., "The Transport Layer Security (TLS) Protocol Version 1.1," IETF RFC 4346, Apr. 2006, 71 pages.

Blake-Wilson, S., et al., "Transport Layer Security (TLS) Extensions," IETF RFC 4366, Apr. 2006, 25 pages.

Anonymous, "Specification for the Advanced Encryption Standard (AES)," US Government FIPS Publication 197, Nov. 26, 2001, 51 pages.

Anonymous, "Secure Hash Standard," US Government FIPS Publication 180-2, Aug. 1, 2002, 75 pages.

Blake-Wilson, S., et al., "Transport Layer Security (TLS) Extensions," IETF RFC 3546, Jun. 2003, 24 pages.

Dworkin, M., "Recommendation for Block Cipher Modes of Operation," US Government NIST Special Publication 800-38A, 2001, 66 pages.

Berners-Lee, T., et al., "Hypertext Markup Language—2.0," Nov. 1995, Network Working Group, Request for Comments: 1866, http://www.ietf.org/rfc/rfc1866.txt?number=1866, printed Jul. 10, 2003, pp. 1-72.

Fielding, R., et al., "Hypertext Transfer Protocol—HTTP/1.1," Jan. 1997, Network Working Group, Request for Comments: 2068, http://www.ietf.org/rfc/rfc2068.txt?number=2068, printed Jul. 10, 2003, pp. 1-152.

Jonsson, J., et al., "Public-Key Cryptography Standards (PKCS) #1: RSA Cryptography Specifications Version 2.1," Feb. 2003, Network Working Group, Request for Comments: 3347, http://www.ietf.org/rfc/rfc3447.txt?number=3447, printed Jul. 10, 2003, pp. 1-68.

Kaliski, B., et al., "PKCS #1: RSA Cryptography Specifications Version 2.0," Oct. 1998, Network Working Group, Request for Comments: 2437, http://www.ietf.org/rfc/rfc2437.txt?number=2437, printed Jul. 10, 2003, pp. 1-37.

International Searching Authority, "Notification of Transmittal of the International Search Report and the Written Opinion of the International Searching Authority, or the Declaration," PCT/US05/00812, dated Jun. 14, 2006, 6 pages.

Yao, Bin, et al., "Proxy-based recovery for applications on wireless hand-held devices", Reliable Distributed Systems, SRDS-2000, Proceedings The 19th IEEE Symposium on Oct. 16-18, 2000, pp. 2-10.

Birk, Y., et al., "Coding on demand by an informed source (ISCOD) for efficient broadcast of different supplemental data to caching clients", Information Theory, IEEE Transactions on vol. 52, Issue 6, Jun. 2006, pp. 2825-2830.

Phatak, S.H., et al., "Web&: an architecture for non-interactive Web", Internet Applications, WIAPP 2001, Proceedings of The Second IEEE Workshop on Jul. 23-24, 2001, pp. 104-112.

B. Kaliski, "PKCS #1, RSA Encryption Version 1.5," Mar. 1998, Network Working Group, Request for Comments: 2313 http://www.ietf.org/rfc/rfc2313.txt?number=2313, printed Jul. 10, 2003, pp. 1-18.

* cited by examiner

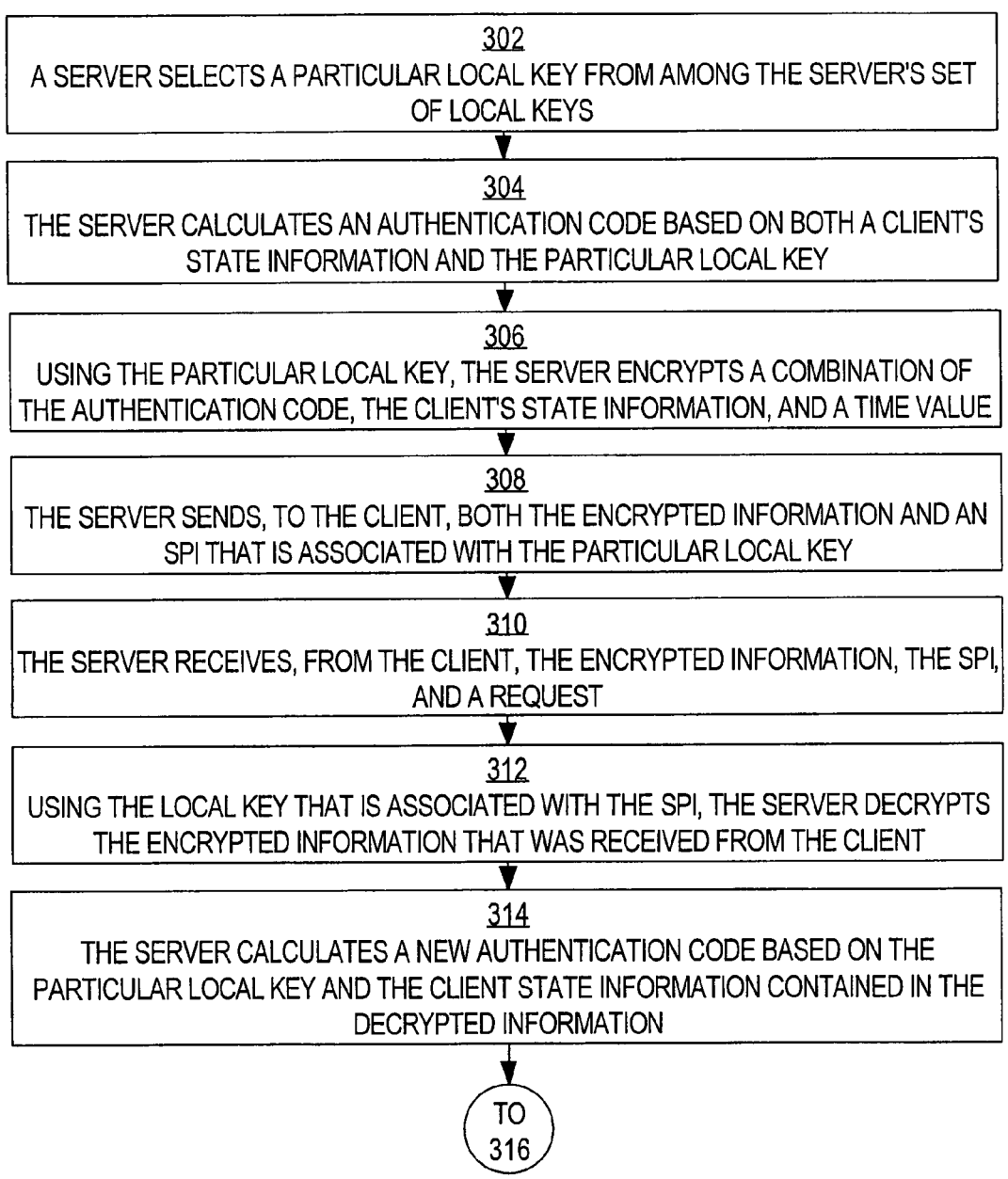

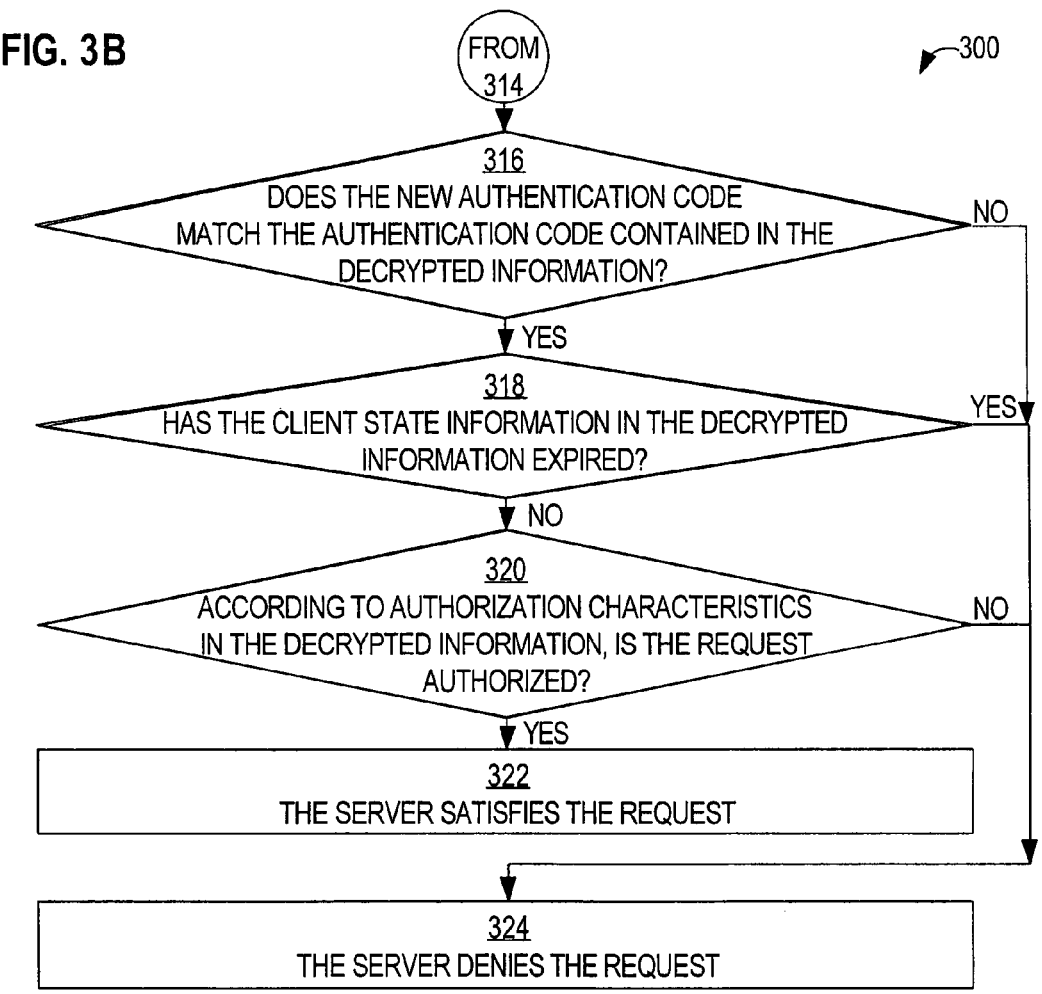

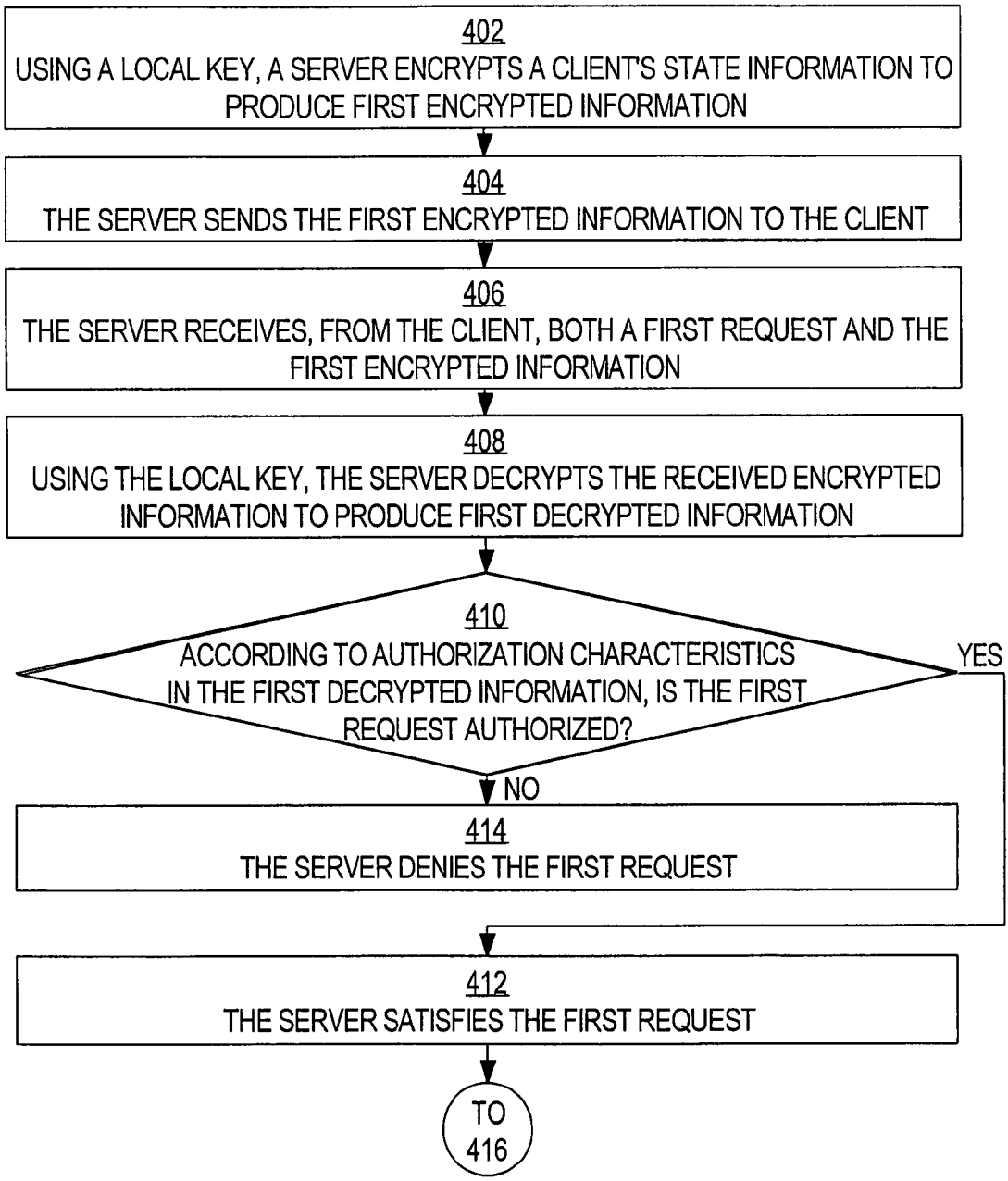

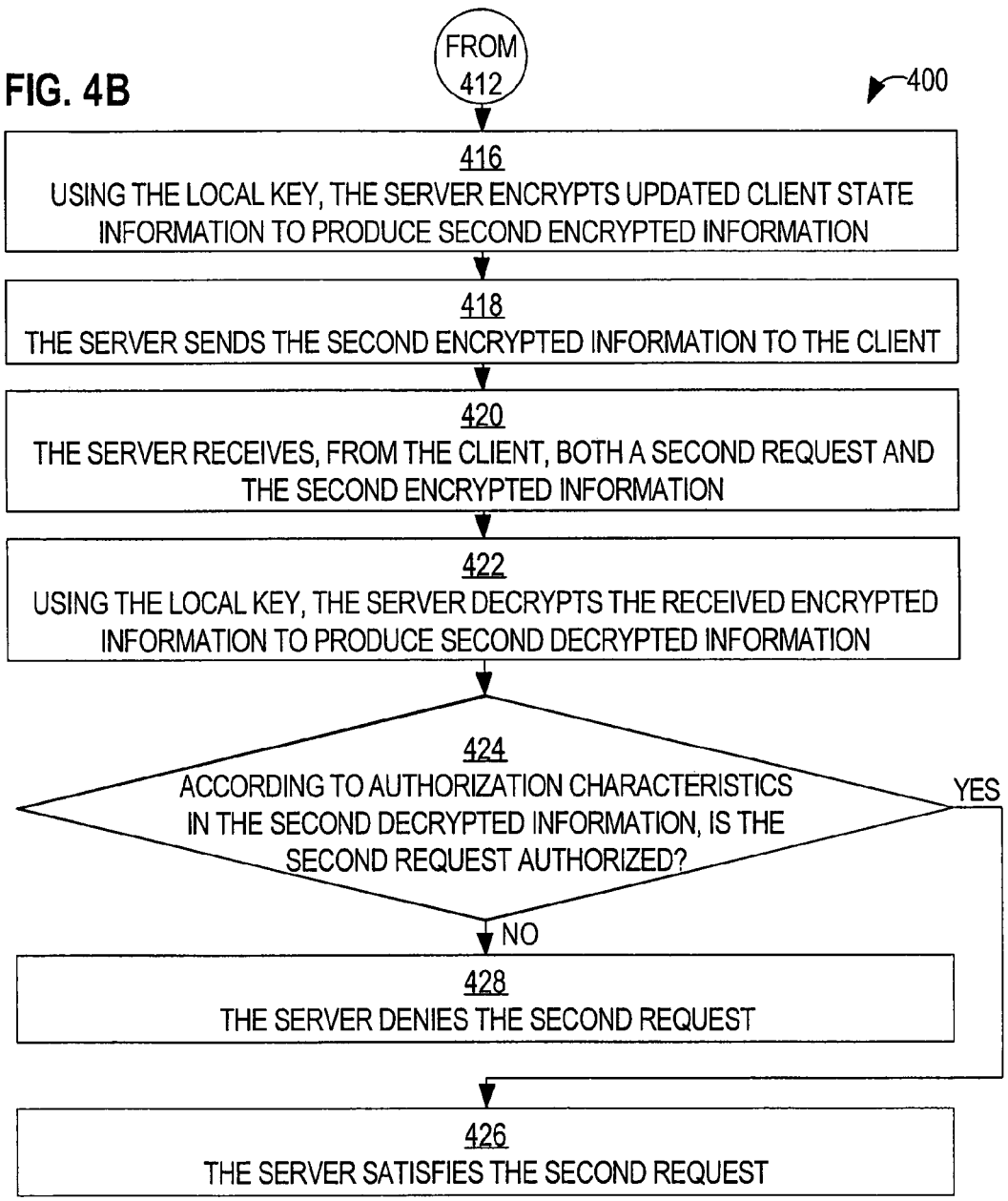

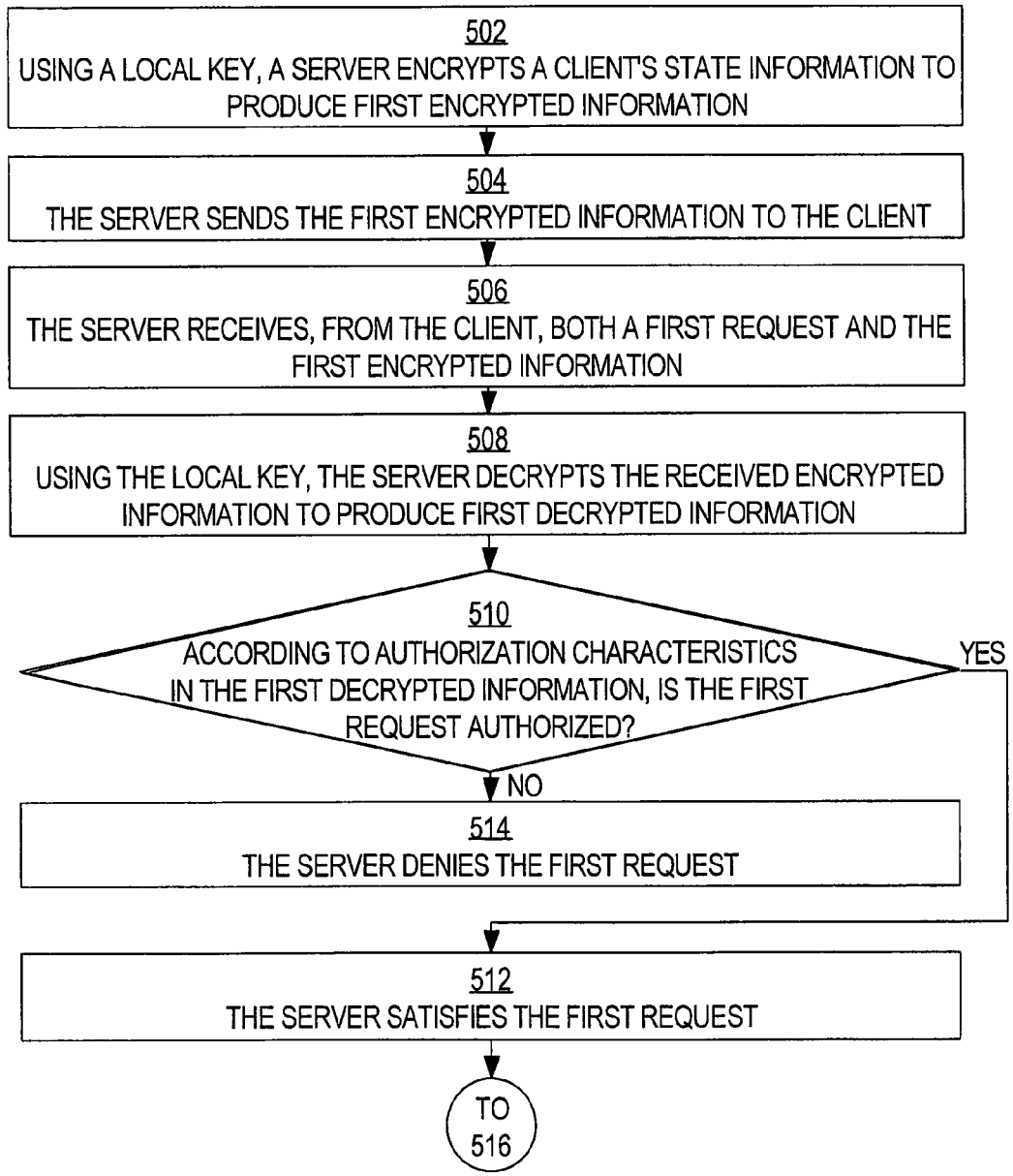

602
A CLIENT STORES ENCRYPTED CLIENT STATE INFORMATION THAT WAS GENERATED BY ENCRYPTING, BASED ON A GENERAL SERVER KEY, THE CLIENT'S STATE INFORMATION

↓

604
THE CLIENT STORES FIRST ENCRYPTED KEY INFORMATION THAT A FIRST SERVER GENERATED BY ENCRYPTING THE GENERAL SERVER KEY USING A FIRST LOCAL KEY THAT IS ASSOCIATED WITH THE FIRST SERVER

↓

606
THE CLIENT ESTABLISHES AN ASSOCIATION BETWEEN THE FIRST SERVER AND THE FIRST ENCRYPTED KEY INFORMATION

↓

608
THE CLIENT STORES SECOND ENCRYPTED KEY INFORMATION THAT A SECOND SERVER GENERATED BY ENCRYPTING THE GENERAL SERVER KEY USING A SECOND LOCAL KEY THAT IS ASSOCIATED WITH THE SECOND SERVER

↓

610
THE CLIENT ESTABLISHES AN ASSOCIATION BETWEEN THE SECOND SERVER AND THE SECOND ENCRYPTED KEY INFORMATION

↓

612
THE CLIENT SENDS, TO THE FIRST SERVER, BOTH THE ENCRYPTED CLIENT STATE INFORMATION AND THE ENCRYPTED KEY INFORMATION THAT IS ASSOCIATED WITH THE FIRST SERVER

↓

614
THE CLIENT SENDS, TO THE SECOND SERVER, BOTH THE ENCRYPTED CLIENT STATE INFORMATION AND THE ENCRYPTED KEY INFORMATION THAT IS ASSOCIATED WITH THE SECOND SERVER

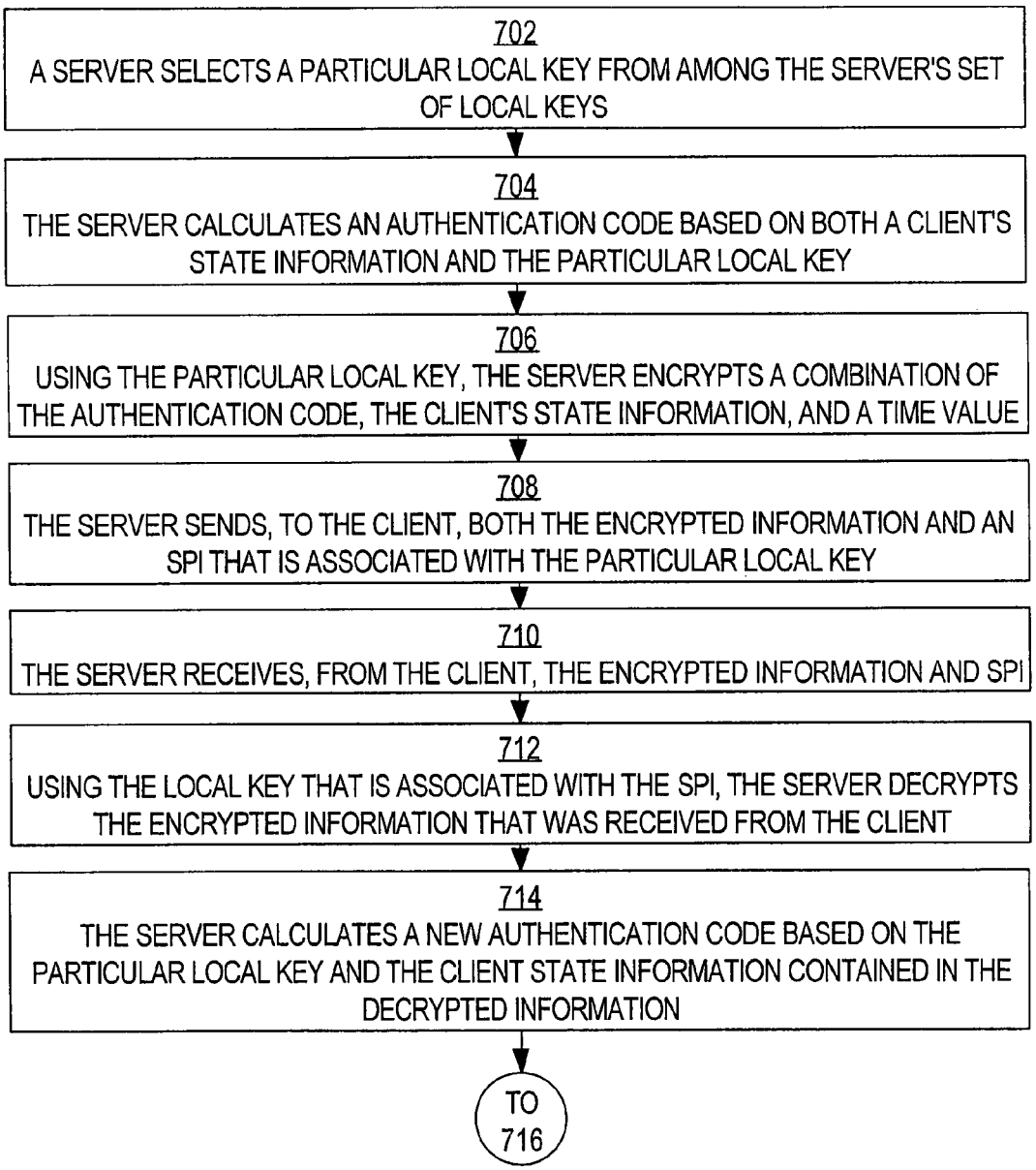

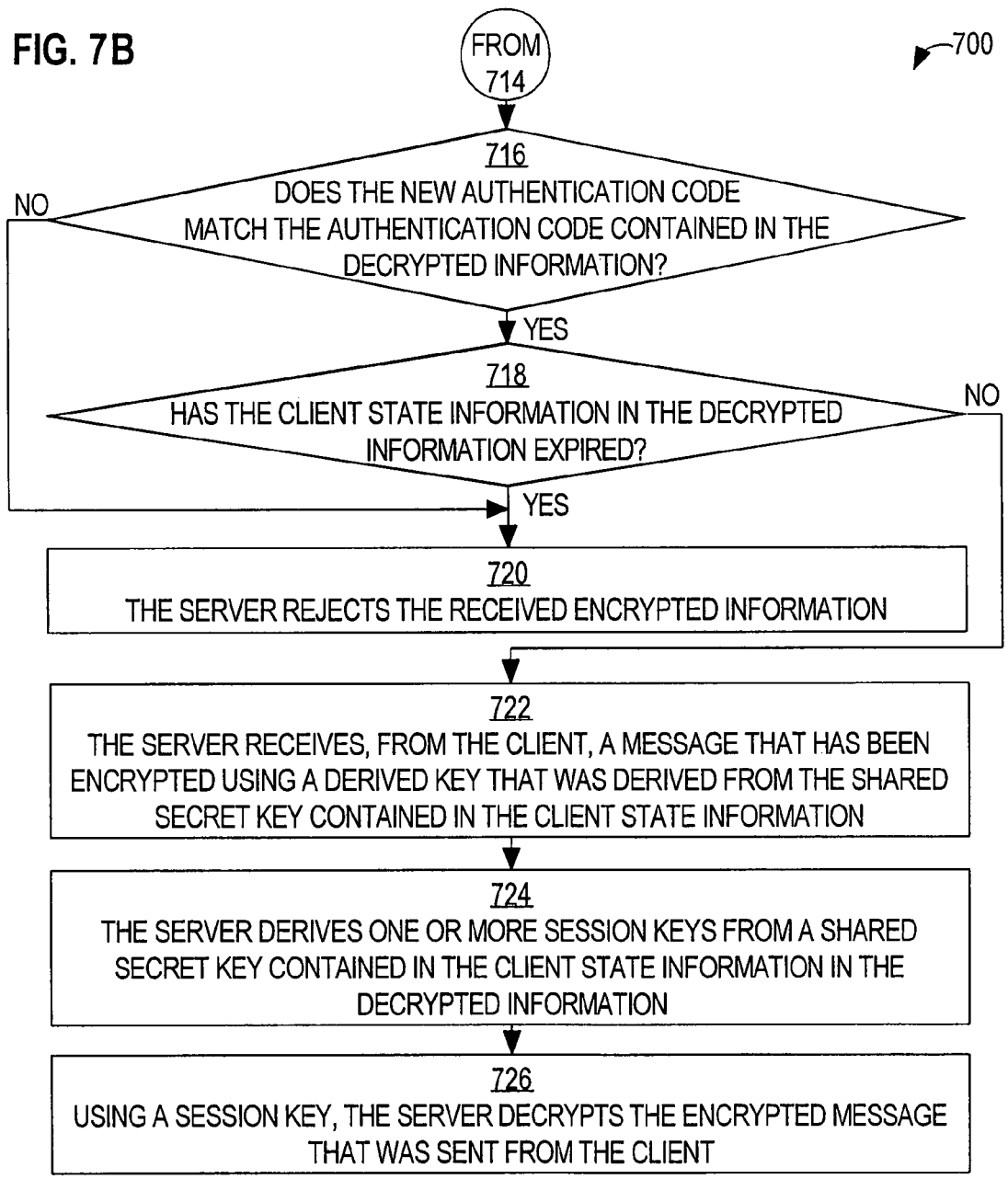

AVOIDING SERVER STORAGE OF CLIENT STATE

RELATED APPLICATIONS

This application is a continuation of U.S. patent application Ser. No. 10/756,633, entitled "AVOIDING SERVER STORAGE OF CLIENT STATE", filed Jan. 12, 2004 now U.S. Pat. No. 7,373,502. This application is related to U.S. patent application Ser. No. 10/756,634, entitled "ENABLING STATELESS SERVER-BASED PRE-SHARED SECRETS", filed Jan. 12, 2004; and U.S. patent application Ser. No. 10/411,964, entitled "METHOD AND APPARATUS FOR SECURELY EXCHANGING CRYPTOGRAPHIC IDENTITIES THROUGH A MUTUALLY TRUSTED INTERMEDIARY", filed Apr. 10, 2003. The entire contents of these applications are hereby incorporated by reference in their entirety for all purposes as if fully set forth herein.

FIELD OF THE INVENTION

The present invention generally relates to authentication, authorization, and security mechanisms for computer networks. The invention relates more specifically to a method and apparatus for avoiding the storage of client state on a server.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

To maintain the security of a private computer network, a client computer ("client") may be required to access the network through a server computer ("server") that acts as an access point to the network. Prior to granting the client access to the network, the server may require the client to supply authentication credentials to the server so that the server can be certain that the client actually is the entity that the client purports to be. The client's authentication credentials indicate the client's identity. If the client's authentication credentials do not match authentication credentials that are stored on the server, then the server refuses the client access to the network. Even after a client has successfully authenticated itself, the server may restrict, based on authorization characteristics that are associated with the client and stored on the server, the client's access to network resources and/or the operations that the client can perform relative to the network resources.

It is not uncommon for unauthorized computers to attempt to eavesdrop on information that is communicated between an authorized client and a server. To prevent unauthorized computers from making use of information that the unauthorized computers should not have received, a client and a server may employ an encryption mechanism to protect information that will be communicated between the client and the server. According to one kind of encryption mechanism, the client and the server both derive one or more session keys from a shared secret key that only the client and the server possess. Before sending messages to each other, the client and the server encrypt the messages using the session keys. Using the session keys, the client and the server can decrypt the encrypted messages that they receive from each other. Computers that do not have the shared secret key cannot derive the session keys, and, consequently, cannot decrypt the encrypted messages communicated between the client and the server.

Multiple clients may access a private network through the same server. To prevent one client from masquerading as another client, different clients typically are associated with different authentication credentials. Different clients may be associated with different authorization characteristics. To prevent one client from making use of information intended exclusively for another client, different clients typically are provided with different shared secret keys. Collectively, a client's authentication credentials, authorization characteristics, and shared secret key are referred to as that client's state information.

According to one approach, a server stores, for each client, separate client state information. Where there are many clients, storing separate client state information for each client uses a large amount of memory. A server's expense is proportionate to the amount of memory that the server requires to store client state information.

Many existing network devices do not contain memory sufficient to store client state information for large numbers of clients. For example, the relatively small amount of memory available to some network routers prevents those network routers from performing the server functions described above when a large number of clients will be accessing a network. Many network routers do not have enough memory to concurrently store many different authentication credentials, authorization characteristics, and shared secret keys. Also, many devices use non-volatile memory systems like flash memory that have limitations on their use. Flash memory can be written to only a fixed number of times, and each write operation can take a significant amount of time. Because of these limitations, flash memory systems are inappropriate for storing dynamic data such as client state information.

In today's increasingly wireless world, memory limitations are not the only concern related to the storage of client state information. A wireless client may roam from one location to another. As a wireless client leaves one location and enters another, the wireless client may seek to access the same private network through a different server. If the server through which the client seeks access does not have the client's state information, then the server will not be able to encrypt messages to and decrypt messages from the client.

One possible approach to solving the problem described above might be to manage a set of servers in such a way that client state information stored on one server is replicated on every server in a domain. However, where there are many clients and many servers, replicating all client state information on every server is a daunting task, especially if new clients are continuously added to the client pool. If each server in a domain needs to be equipped with a very large amount of memory to store all of the client state information for all of the clients, then the expense to the administrators of the domain may be unbearable. Indeed, if the number of clients increases at a sufficiently rapid pace, the administrators may find it impossible to keep up with the growth.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 3A and 3B are flow diagrams that illustrates one embodiment of a method for avoiding the storage of client authorization characteristics on a server;

FIGS. 4A and 4B are flow diagrams that illustrate one embodiment of a method for replacing encrypted client state information that is stored on a client;

FIGS. 5A and 5B are flow diagrams that illustrate one embodiment of a method for amending encrypted client state information that is stored on a client;

FIG. 6 is a flow diagram that illustrates one embodiment of a method for eliminating the redundant storage of identical client state information;

FIGS. 7A and 7B are flow diagrams that illustrate one embodiment of a method for avoiding the storage of shared secret keys on a server.

DETAILED DESCRIPTION OF THE PREFERRED EMBODIMENT

Figure 1:
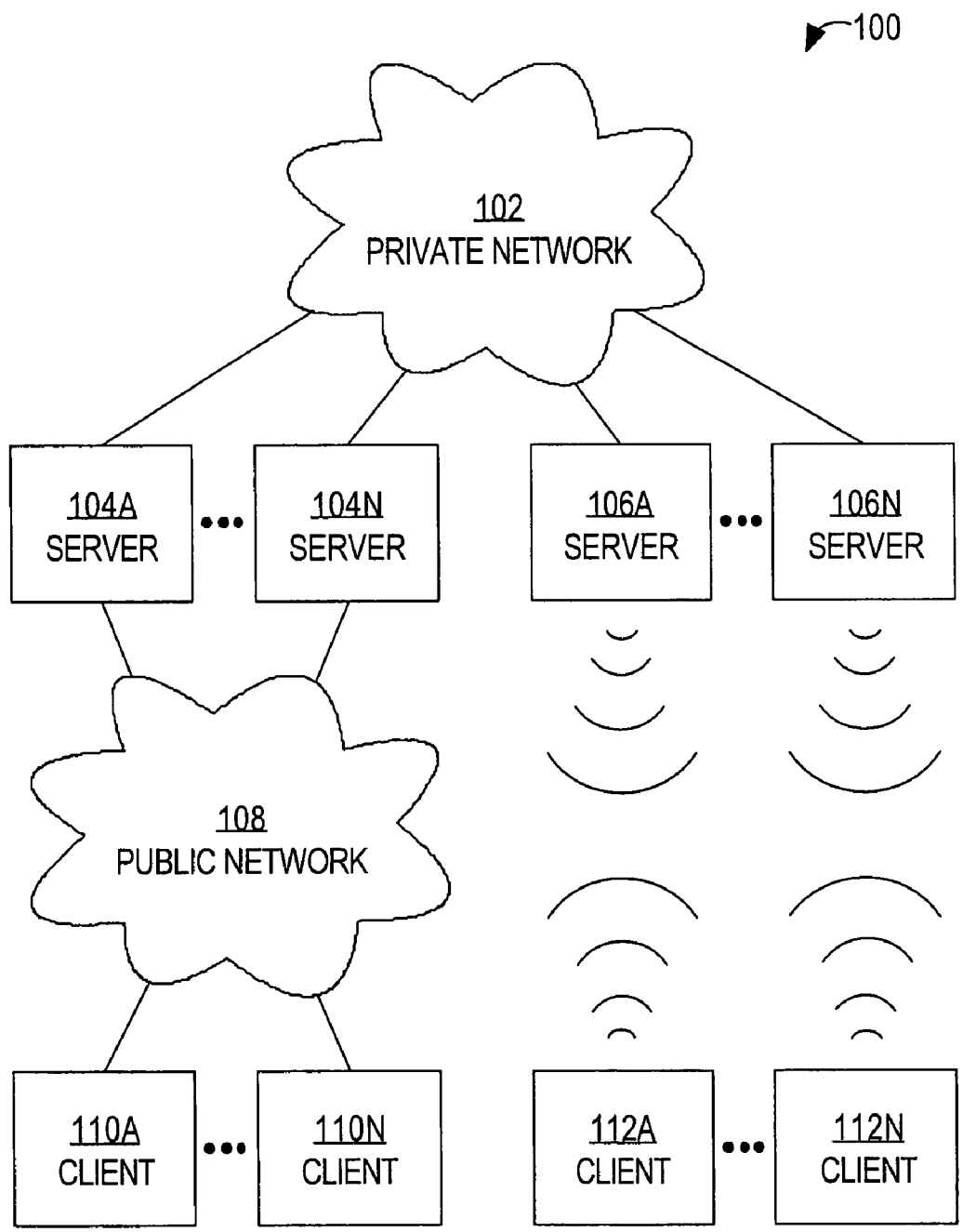
FIG. 1 is a block diagram that illustrates an overview of a system in which client state information is stored mainly on a client instead of a server.

A method and apparatus for avoiding the storage of client state on a server is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Implementation Examples
   3.1 Avoiding the Storage of Authorization Characteristics On a Server
   3.2 Updating Encrypted Client State Information Stored On Clients
   3.3 Eliminating the Redundant Storage of Identical Client State Information
   3.4 Avoiding the Storage of Session State Information On an Intermediate Device
   3.5 Avoiding the Storage of Shared Secret Keys On a Server
4.0 Implementation Mechanisms—Hardware Overview
5.0 Extensions and Alternatives

1.0 General Overview

The needs identified in the foregoing Background, and other needs and objects that will become apparent for the following description, are achieved in the present invention, which comprises, in one aspect, a method for avoiding the storage of client state on a server. Based on a local key that is not known to a client, a server encrypts the client's state information. The client's state information may include, for example, the client's authentication credentials, the client's authorization characteristics, and a shared secret key that the client uses to derive session keys.

By any of a variety of mechanisms, the encrypted client state information is provided to the client. For example, the server may send the encrypted state information to the client over a network. Because the client does not have the local key, the client cannot decrypt the encrypted state information. The encrypted information is, therefore, "opaque" to the client.

The client stores the client's encrypted state information. After the client has stored the encrypted client state information, the server no longer needs to store the client's state information. Therefore, the server may free memory that stored the client's state information. The server may use the memory for other purposes.

When the server needs the client's state information—for example, to derive session keys or to determine a client's authorization characteristics—the server may request the client's encrypted state information from the client. In response to the server's request, the client may send, to the server, the encrypted state information that the client stored before. Alternatively, the client may send the client's encrypted state information to the server when the client initiates communication with the server, even in the absence of a request from the server.

After receiving the encrypted client state information from the client, the server decrypts the client state information using the local key, and verifies the authenticity of the message using the message authentication code provided in the opaque data. After the server has decrypted the client state information, the server may use the client state information for whatever purposes the server would normally use the client state information. When the server is finished with the client state information, the server may, once again, free the memory that stored the client state information. Because each client stores that client's own state information in encrypted form, the server does not need to store any client's state information permanently.

In other aspects, the invention encompasses a computer apparatus and a computer-readable medium configured to carry out the foregoing steps.

2.0 Structural and Functional Overview

FIG. 1 is a block diagram that illustrates an overview of a system 100 in which client state information is stored mainly on a client instead of a server. System 100 comprises a private network 102, servers 104A-N, servers 106A-N, a public network 108, clients 110A-N, and clients 112A-N. Private network 102 may be a computer network such as a local area network (LAN) or a wide area network (WAN). Access to private network 102 from outside private network 102 is obtained only through servers 104A-N and servers 106A-N.

Servers 104A-N and servers 106A-N may be network elements such as network routers, network switches, or network bridges. Servers 104A-N are coupled communicatively to private network 102. Servers 104A-N also may be coupled communicatively to public network 108. Public network 108 may be a computer network such as a LAN or a WAN. Public network 108 may comprise the Internet. Public network 108 may be a network that is not trusted by servers 104A-N or clients 110A-N. Alternatively, one or more of servers 104A-N may be coupled directly to one or more of clients 110A-N.

Servers 106A-N are coupled communicatively to private network 102. Servers 106A-N may communicate through a wireless medium with clients 112A-N. Similarly, clients 112A-N may communicate through a wireless medium with servers 106A-N.

Clients 110A-N and clients 112A-N may be personal computers or diskless workstations. Clients 110A-N and clients 112A-N may be mobile devices such as laptop computers. Clients 110A-N may be coupled communicatively to public network 108. Alternatively, one or more of clients 110A-N may be coupled directly to one or more of servers 104A-N.

Each of clients 110A-N and clients 112A-N corresponds to different client state information. A client's state information may include, for example, the client's authentication credentials, the client's authorization characteristics, and a shared secret key that the client uses to derive session keys. A client's authentication credentials may indicate the client's unique identity. A client's authentication credentials may comprise a username and a password. A client's authorization characteristics may indicate the resources that the client is allowed to access within private network 102. A client's authorization characteristics may indicate the operations that the client is allowed to perform relative to resources within private network 102.

Servers 104A-N and servers 106A-N each store a local key that is not known to any of clients 110A-N and clients 112A-N. In one embodiment, each server's local key is different from every other server's local key. In another embodiment, each server's local key is the same. Using their local keys, servers 104A-N and servers 106A-N encrypt client state information that corresponds to clients 110A-N and clients 112A-N. By any of a variety of mechanisms, each client's encrypted client state information is provided to that client.

Each of clients 110A-N and clients 112A-N stores that client's encrypted state information. In one embodiment, clients 110A-N and clients 112A-N establish associations between encrypted client state information and the servers that encrypted that client state information. For example, both server 104A and server 104B may encrypt the client state information of client 110A. Client 110A may store, separately, the encrypted client state information that was encrypted by server 104A, and the encrypted client state information that was encrypted by server 104B. Client 110A may establish, separately, an association between server 104A and the encrypted state information that was encrypted by server 104A, and an association between server 104B and the encrypted state information that was encrypted by server 104B.

Because clients 110A-N and clients 112A-N store encrypted client state information, servers 104A-N and servers 106A-N do not need to store client state information permanently. Servers 104A-N and servers 106A-N may free, for other purposes, memory that stored client state information.

When any one of servers 104A-N or servers 106A-N needs the client state information of any one of clients 110A-N or clients 112A-N, the server may request the client's encrypted state information from the client. When any one of clients 110A-N or clients 112A-N receives such a request, the client may send, to the server, the encrypted state information that is associated with the server. Alternatively, any one of clients 110A-N or clients 112A-N may send the client's encrypted state information to a server when the client initiates communication with the server, even in the absence of a request from the server.

When any one of servers 104A-N or servers 106A-N receives encrypted client state information from a client, the server decrypts the client state information using the server's local key. After the server has decrypted the client state information, the server may use the client state information for whatever purposes the server would normally use the client state information. When the server is finished with the client state information, the server may free the memory that stored the client state information. Thus, with a relatively small amount of memory, servers 104A-N and servers 106A-N may perform authentication and authorization functions even when there are many different clients.

Figure 2:
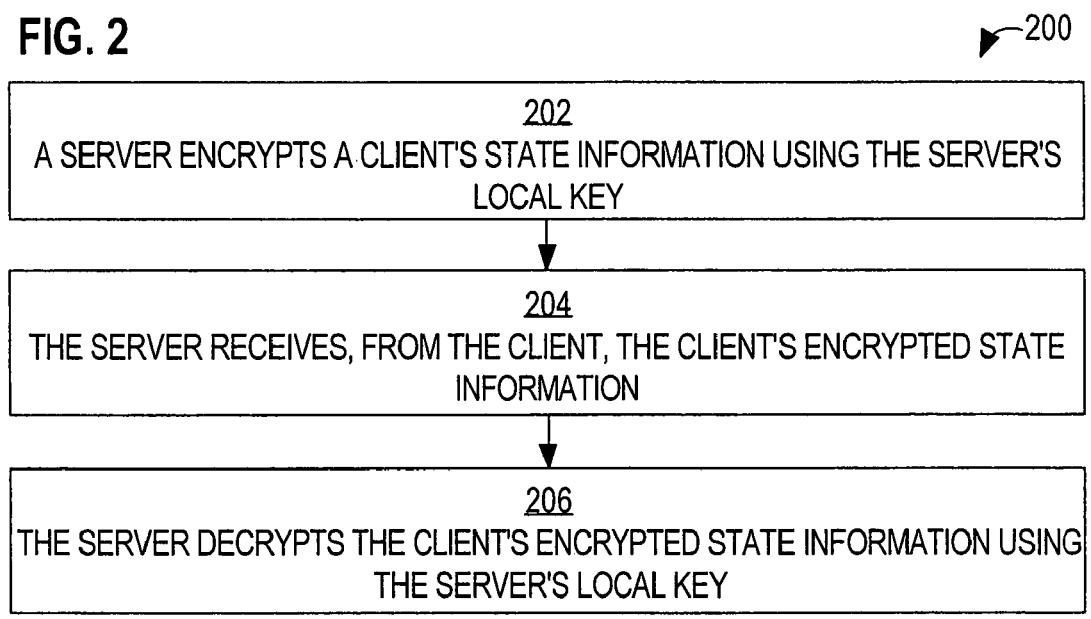
FIG. 2 is a flow diagram that illustrates a high level overview of one embodiment of a method for avoiding the storage of client state information on a server.

FIG. 2 is a flow diagram 200 that illustrates a high level overview of one embodiment of a method for avoiding the storage of client state information on a server. In block 202, a server encrypts a client's state information using the server's local key. The client does not have access to the server's local key. For example, server 104A may encrypt the client state information of client 110A using the local key of server 104A. Additionally, server 104A may encrypt the client state information of client 110B using the local key of server 104A.

The encrypted client state information of clients 110A and 110B may be provided to clients 110A and 110B, respectively. Upon receiving encrypted client state information, clients 110A and 110B may store the encrypted client state information.

In block 204, the server receives, from the client, the client's encrypted state information. Continuing the example, server 104A may receive, from client 110A, the encrypted client state information of client 110A. Additionally, server 104A may receive, from client 110B, the encrypted client state information of client 110B.

In block 206, the server decrypts the client's encrypted state information using the server's local key. Continuing the example, using the local key of server 104A, server 104A may decrypt the encrypted client state information received from client 110A. Additionally, using the local key of server 104A, server 104A may decrypt the encrypted client state information received from client 110B. Server 104A may use the decrypted client state information of clients 110A and 110B in the same manner that server 104A would have used the client state information if server 104A had stored the client state information locally and continuously. However, server 104A does not need to store any client state information on a continuous basis.

Detailed example implementations of the foregoing general approach are described below.

3.0 Implementation Examples 3.1 Avoiding the Storage of Authorization Characteristics on a Server According to one embodiment, whenever any one of clients 110A-N or clients 112A-N sends a request to any one of servers 104A-N or servers 106A-N, the client sends the client's encrypted state information to the server along with the request. The server may determine, from authorization characteristics included in the client's encrypted state information, whether the client's request should be satisfied or denied. Each of clients 110A-N and clients 112A-N may be associated with different authorization characteristics.

FIGS. 3A and 3B depict a flow diagram 300 that illustrates one embodiment of a method for avoiding the storage of client authorization characteristics on a server. In one embodiment, each of servers 104A-N and servers 106A-N stores a different set of local keys. A server may encrypt client state information using any local key in the server's set of local keys. By using different local keys at different times, security is increased. Each local key is associated with a different index value called a Security Parameter Index (SPI). Although the technique described below refers for sake of illustration to a single client, the technique described below may be applied to multiple clients, each client having separate client state information.

In block 302, a server selects a particular local key from among the server's set of local keys. For example, the server may be one of servers 104A-N or servers 106A-N.

In block 304, the server calculates an authentication code based on both a client's state information and the particular local key. The client's state information includes the client's authorization characteristics. The client's state information also indicates the client's unique identity. The authentication code is a function of a combination of the client's state information and the particular local key. The function may be implemented so that no two different combinations cause the function to yield the same authentication code.

In block 306, using the particular local key, the server encrypts a combination of the authentication code, the client's state information, and a time value. The time value indicates a future time at which the server should deem the client's state information to be expired. The time value may be calculated, for example, by adding a constant value to the current value of the server's clock. The server's clock does not need to be set to the correct time value, nor synchronized to any other particular clock, since the time value in the client's state information is set by the server and is, in one embodiment, checked only by the server. The result of the encryption is referred to herein as the encrypted information.

In block 308, the server sends, to the client, both the encrypted information and the SPI that is associated with the particular local key. For example, the client may be one of clients 110A-N or clients 112A-N. The client stores the encrypted information and the SPI, and establishes associations between the server and the encrypted information, and between the encrypted information and the SPI. After the client has stored this information, the server may free the server's memory that stored the client's state information, both in plain and in encrypted forms.

Thereafter, when the client sends a request to the server, the client also sends the encrypted information that is associated with the server, and the SPI that is associated with the encrypted information. In block 310, the server receives, from the client, the encrypted information, the SPI, and a request.

In block 312, using the local key that is associated with the SPI, the server decrypts the encrypted information that was received from the client. The result of the decryption is referred to herein as the decrypted information.

The decrypted information contains at least an authentication code, client state information, and a time value. In block 314, the server calculates a new authentication code using the same function that the server used in block 304. The new authentication code is a function of a combination of the particular local key and the client state information that is contained in the decrypted information.

In block 316, the server determines whether the new authentication code matches the authentication code that is contained in the decrypted information. If the authentication codes match, then control passes to block 318. If the authentication codes do not match, then control passes to block 324. In this manner, the server authenticates the information contained in the decrypted information.

In block 318, by comparing a current time value to the time value contained in the decrypted information, the server determines whether the client state information contained in the decrypted information has expired. If the current time value is less than the time value contained in the decrypted information, then control passes to block 320. If the current time value is not less than the time value contained in the decrypted information, then control passes to block 324.

In block 320, the server determines, based on authorization characteristics that are contained in the decrypted information, whether the request received in block 310 is authorized. If the request is authorized, then control passes to block 322. If the request is not authorized, then control passes to block 324.

In block 322, the server satisfies the request.

Alternatively, in block 324, the server denies the request.

After the server has either satisfied or denied the request, the server may free the server's memory that stored the client's state information, both in plain and in encrypted forms. Thus, the server may avoid storing client state information, including authorization characteristics, on more than a merely temporary, non-continuous basis.

Although the technique described above refers for sake of illustration to a single client, a server may, according to the technique described above, encrypt separate client state information for each of a plurality of clients, and receive, from each of those clients, separate encrypted state information. For example, server 104A may encrypt client state information for client 110A and send that encrypted information to client 110A, and server 104A may encrypt client state information for client 110B and send that encrypted information to client 110B. Server 104A may receive, from client 110A, encrypted information sent to client 110A, and use the client state information contained therein when communicating with client 110A. Similarly, server 104A may receive, from client 110B, encrypted information sent to client 110B, and use the client state information contained therein when communicating with client 110B.

3.2 Updating Encrypted Client State Information Stored on Clients

In one embodiment, each of clients 110A-N and clients 112A-N is configured to obey the following rules regarding encrypted client state information. When a client receives encrypted client state information from a server, the client stores the encrypted client state information. For example, the client may store the value in the client's random access memory (RAM) and/or on the client's hard disk drive.

When a client receives updated encrypted client state information from a server, the client stores the updated encrypted client state information. The client may replace previously stored encrypted client state information that is associated with the server with encrypted client state information later received from the server. This rule permits a server to change a client's authorization characteristics.

When a client receives additional encrypted client state information from a server, the client appends the additional encrypted client state information to the previously stored encrypted client state information that is associated with the server. This rule permits a server to add authorization characteristics to a client's existing authorization characteristics without requiring the client to send the previously stored encrypted client state information to the server.

In one embodiment, a server indicates to a client whether the client should replace currently stored encrypted client state information with newly received encrypted client state information, or append newly received encrypted client state information to currently stored encrypted client state information.

FIGS. 4A and 4B depict a flow diagram 400 that illustrates one embodiment of a method for replacing encrypted client state information that is stored on a client. In block 402, using a local key, a server encrypts a client's state information. For example, the server may be one of servers 104A-N or servers 106A-N. The result of the encryption is referred to below as the first encrypted information.

In block 404, the server sends the first encrypted information to the client. For example, the client may be one of clients 110A-N or clients 112A-N. The client stores the first encrypted information, and establishes an association between the server and the first encrypted information.

The client sends, to the server, both a first request and the first encrypted information. In block 406, the server receives, from the client, both the first request and the first encrypted information.

In block 408, using the local key, the server decrypts the encrypted information that was received from the client in block 406. The result of the decryption is referred to below as the first decrypted information.

In block 410, the server determines, based on authorization characteristics that are contained in the first decrypted information, whether the first request is authorized. If the first request is authorized, then control passes to block 412. If the first request is not authorized, then control passes to block 414.

In block 412, the server satisfies the first request. Control passes to block 416.

Alternatively, in block 414, the server denies the first request. The server may deny all subsequent requests from the client.

In block 416, using the local key, the server encrypts updated client state information for the client. The result of the encryption is referred to below as the second encrypted information.

In block 418, the server sends the second encrypted information to the client. The client stores the second encrypted information, and establishes an association between the server and the second encrypted information. The client's receipt of the second encrypted information renders the first encrypted information invalid. The client may replace the first encrypted information with the second encrypted information.

The client sends, to the server, both a second request and the second encrypted information. In block 420, the server receives, from the client, both the second request and the second encrypted information.

In block 422, using the local key, the server decrypts the encrypted information that was received from the client in block 420. The result of the decryption is referred to below as the second decrypted information.

In block 424, the server determines, based on authorization characteristics that are contained in the second decrypted information, whether the second request is authorized. If the second request is authorized, then control passes to block 426. If the second request is not authorized, then control passes to block 428.

In block 426, the server satisfies the second request.

Alternatively, in block 428, the server denies the second request. The server may deny all subsequent requests from the client.

Figure 5B:
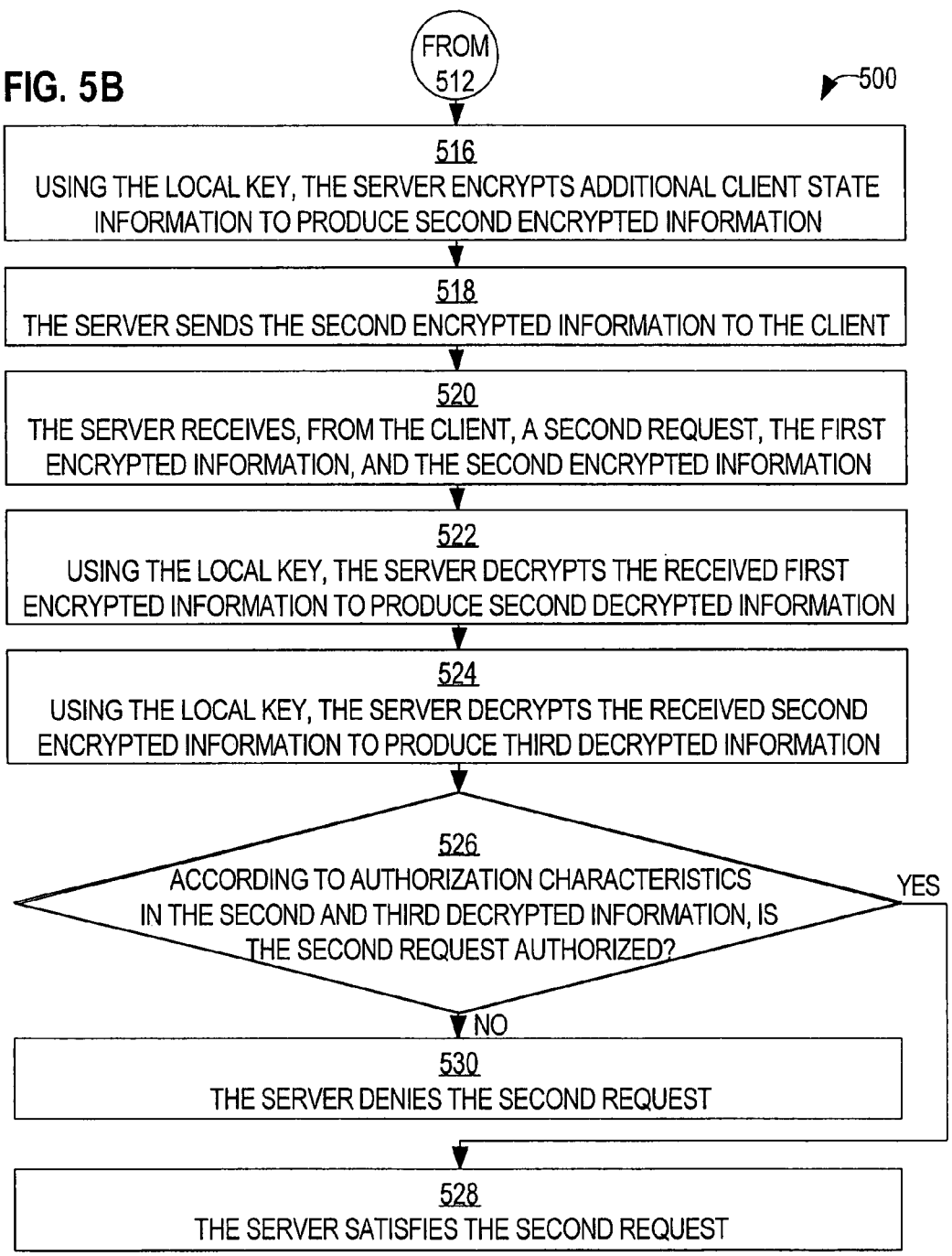

FIGS. 5A and 5B depict a flow diagram 500 that illustrates one embodiment of a method for amending encrypted client state information that is stored on a client. In block 502, using a local key, a server encrypts a client's state information. For example, the server may be one of servers 104A-N or servers 106A-N. The result of the encryption is referred to below as the first encrypted information.

In block 504, the server sends the first encrypted information to the client. For example, the client may be one of clients 110A-N or clients 112A-N. The client stores the first encrypted information, and establishes an association between the server and the first encrypted information.

The client sends, to the server, both a first request and the first encrypted information. In block 506, the server receives, from the client, both the first request and the first encrypted information.

In block 508, using the local key, the server decrypts the encrypted information that was received from the client in block 506. The result of the decryption is referred to below as the first decrypted information.

In block 510, the server determines, based on authorization characteristics that are contained in the first decrypted information, whether the first request is authorized. If the first request is authorized, then control passes to block 512. If the first request is not authorized, then control passes to block 514.

In block 512, the server satisfies the first request. Control passes to block 516.

Alternatively, in block 514, the server denies the first request. The server may deny all subsequent requests from the client.

In block 516, using the local key, the server encrypts additional client state information for the client. The result of the encryption is referred to below as the second encrypted information.

In block 518, the server sends the second encrypted information to the client. The client stores the second encrypted information, and establishes an association between the server and the second encrypted information. The client's receipt of the second encrypted information does not render the first encrypted information invalid. The client does not replace the first encrypted information with the second encrypted information.

The client sends, to the server, a second request, the first encrypted information, and the second encrypted information. In block 520, the server receives, from the client, the second request, the first encrypted information, and the second encrypted information.

In block 522, using the local key, the server decrypts the first encrypted information that was received from the client in block 520. The result of the decryption is referred to below as the second decrypted information.

In block 524, using the local key, the server decrypts the second encrypted information that was received from the client in block 520. The result of the decryption is referred to below as the third decrypted information.

In block 526, the server determines, based on both authorization characteristics that are contained in the second decrypted information and authorization characteristics that are contained in the third decrypted information, whether the second request is authorized. If the second request is authorized, then control passes to block 528. If the second request is not authorized, then control passes to block 530.

In block 528, the server satisfies the second request.

Alternatively, in block 530, the server denies the second request. The server may deny all subsequent requests from the client.

Using the approaches described above, a server may issue new authorization characteristics to a client or revoke a client's existing authorization characteristics.

The approach described above with reference to flow diagram 500 may be used relative to multiple ones of clients 110A-N and clients 112A-N. Each of a plurality of clients may send, to a given server, encrypted information that contains authorization characteristics for that client. Each client's authorization characteristics may differ from each other client's authorization characteristics.

3.3 Eliminating the Redundant Storage of Identical Client State Information

In one embodiment, multiple servers may provide authentication and authorization services to a client. If each server issued separate encrypted state information to a client, then the client might store multiple copies of the same client state information; each copy encrypted under a different server's local key. If the client state information is large, then this redundancy wastes significant storage resources of the client.

To avoid this redundant storage of identical client state information, client state information can be encrypted using a general server key that is accessible to all of the servers but none of the clients. Each server may encrypt the general server key using that server's local key. When a server sends encrypted client state information to a client, the server also sends the general server key that has been encrypted using the server's local key. The client may store multiple encrypted general server keys (one for each server) and just one copy of the encrypted client state information. For each server, the client may establish an association between the server, that server's encrypted general server key, and the encrypted client state information. Because each encrypted general server key is substantially smaller than the encrypted client state information, this storage approach preserves the client's storage resources. This technique avoids the need for multiple servers to share a single value of the local key. This property limits the effects of the compromise of a single server; an attacker who subverts one server will, at most, uncover only the data encrypted with the local keys of that server.

When a client sends a request to a server, the client also sends the encrypted general server key that is associated with that server, and the encrypted client state information that is associated with the encrypted general server key. A server that receives the encrypted general server key can decrypt the encrypted general server key to obtain the decrypted general server key. Using the decrypted general server key, the server can decrypt the encrypted client state information.

FIG. 6 is a flow diagram 600 that illustrates one embodiment of a method for eliminating the redundant storage of identical client state information. In block 602, a client stores encrypted client state information that was generated by encrypting, based on a general server key, the client's state information. For example, client 110A may store encrypted client state information that server 104A encrypted using a general server key that is not accessible to client 110A.

In block 604, the client stores first encrypted key information that a first server generated by encrypting the general server key using a first local key that is associated with the first server. Continuing the example, using a local key of server 104A, server 104A may encrypt the general server key to produce first encrypted key information. Server 104A may send the first encrypted key information to client 110A. Client 110A may receive the first encrypted key information and store the first encrypted key information.

In block 606, the client establishes an association between the first server and the first encrypted key information. Continuing the example, client 110A may establish an association between the first encrypted key information and server 104A.

In block 608, the client stores second encrypted key information that a second server generated by encrypting the general server key using a second local key that is associated with the second server. Continuing the example, using a local key of server 104B, server 104B may encrypt the general server key to produce second encrypted key information. Server 104B may send the second encrypted key information to client 110A. Client 110A may receive the second encrypted key information and store the second encrypted key information.

In block 610, the client establishes an association between the second server and the second encrypted key information.

Continuing the example, client 110A may establish an association between the second encrypted key information and server 104B.

The first local key may differ from the second local key. The first local key may be inaccessible to all except the first server. The second local key may be inaccessible to all except the second server. Thus, in the example above, server 104A may be incapable of decrypting the second encrypted key information, and server 104B may be incapable of decrypting the first encrypted key information.

In block 612, the client sends, to the first server, both the encrypted client state information and the encrypted key information that is associated with the first server. Continuing the example, client 110A may send the encrypted client state information and the first encrypted key information to server 104A. Using the local key of server 104A, server 104A may decrypt the first encrypted key information to obtain the general server key. Using the general server key, server 104A may decrypt the encrypted client state information.

In block 614, the client sends, to the second server, both the encrypted client state information and the encrypted key information that is associated with the second server. Continuing the example, client 110A may send the encrypted client state information and the second encrypted key information to server 104B. Using the local key of server 104B, server 104B may decrypt the first encrypted key information to obtain the general server key. Using the general server key, server 104B may decrypt the encrypted client state information.

As a result, in the example above, client 110A may store just one copy of the encrypted client state information pertaining to client 110A. This conserves the storage resources of client 110A.

3.4 Avoiding the Storage of Session State Information on an Intermediate Device

The approaches described above may be adapted to avoid the storage of session state information on intermediate devices. One such type of intermediate device is called a "responder." A responder is a device that responds to a first device's request to participate in a session with a second device.

One example of a responder is the "introducer device" described in co-pending U.S. application Ser. No. 10/411,964, entitled "METHOD AND APPARATUS FOR SECURELY EXCHANGING CRYPTOGRAPHIC IDENTITIES THROUGH A MUTUALLY TRUSTED INTERMEDIARY". As described in that application, the introducer device facilitates the secure exchange of cryptographic identities between a "petitioner device" and an "authority device," both of which already trust the introducer device.

If a responder is required to store session state information, then the responder may be exposed to denial-of-service attacks. To avoid storing session state information on a responder, session state information may be encrypted. The responder may forward the encrypted session state information along with other information that the first and second devices send to each other through the responder. The first and second devices may send the encrypted session state information to the responder along with other information that the responder is expected to process. The first and second devices may return, to the responder, whatever encrypted session state information the first and second devices receive from the responder. Thus, the encrypted session state information may be called an "echo." When the responder receives an echo, the responder may check the protections on the echo.

The echo may include a time value that indicates when an associated session has expired. The responder may compare the time value with the current value of the responder's clock to determine whether the session has expired.

When using a cryptographic protocol, a responder may issue a random nonce, and then store the nonce for use in processing messages that the responder will receive in the future. For example, a responder may issue a random nonce when participating in a challenge/response protocol. In order to avoid storing the nonce on the responder, the nonce may be included in an echo. Other information, such as identifiers, network addresses, and data for selecting protocol options, also may be included in the echo.

3.5 Avoiding the Storage of Shared Secret Keys on a Server

Each of clients 11A-N and clients 112A-N may be associated with a different shared secret key. Clients 110A-N and clients 112A-N may use their shared secret keys to derive session keys that the clients may use to encrypt and decrypt messages that the clients send to and receive from servers 104A-N and servers 106A-N. In this manner, a secure "tunnel" may be established between clients and server. However, in order for servers 104A-N and servers 106A-N to establish these secure tunnels, servers 104A-N and servers 104A-N also need to have access to the shared secret keys so that the servers also can derive the session keys. When there are many clients, storing a different shared secret key for each separate client can require amounts of memory that no network element realistically may possess.

Therefore, according to one embodiment, when any one of clients 110A-N or clients 112A-N initiates communication with any one of servers 104A-N or servers 106A-N, the client sends the client's encrypted state information to the server. In response, the client sends the client's encrypted state information to the server. The client's encrypted state information contains the client's shared secret key.

The server may use the server's local key to decrypt the client's encrypted state information, thereby obtaining the client's shared secret key. The server may derive one or more session keys from the client's shared secret key. Using the one or more session keys, the server may encrypt and decrypt messages sent to and received from the client. When the server has finished communicating with the client, the server may free, for other purposes, the server's memory that was used to store the client's shared secret key and any corresponding session keys. Therefore, the server is not required to concurrently store different shared secret keys for every client that has access private network 102.

FIGS. 7A and 7B depict a flow diagram 700 that illustrates one embodiment of a method for avoiding the storage of shared secret keys on a server. In one embodiment, each of servers 104A-N and servers 106A-N stores a different set of local keys. A server may encrypt client state information using any local key in the server's set of local keys. By using different local keys at different times, security is increased. Each local key is associated with a different SPI. In block 702, a server selects a particular local key from among the server's set of local keys. For example, the server may be one of servers 104A-N or servers 106A-N.

In block 704, the server calculates an authentication code based on both a client's state information and the particular local key. The client's state information includes the client's shared secret key. The client's state information also indicates the client's unique identity. The authentication code is a function of a combination of the client's state information and the particular local key. The function may be implemented so that no two different combinations cause the function to yield the same authentication code.

In block 706, using the particular local key, the server encrypts a combination of the authentication code, the client's state information, and a time value. The time value indicates a future time at which the server should deem the client's state information to be expired. The time value may be calculated, for example, by adding a constant value to the current value of the server's clock. The result of the encryption is referred to herein as the encrypted information.

In block 708, the server sends, to the client, both the encrypted information and the SPI that is associated with the particular local key. For example, the client may be one of clients 110A-N or clients 112A-N. The client stores the encrypted information and the SPI, and establishes associations between the server and the encrypted information, and between the encrypted information and the SPI. After the client has stored this information, the server may free the server's memory that stored the client's state information, both in plain and in encrypted forms.

When the client initiates communication with the server, the client may send both the encrypted information and the associated SPI to the server. In block 710, the server receives, from the client, both encrypted information and the SPI.

In block 712, using the local key that is associated with the SPI, the server decrypts the encrypted information that was received from the client. The result of the decryption is referred to herein as the decrypted information.

The decrypted information contains at least an authentication code, client state information, and a time value. In block 714, the server calculates a new authentication code using the same function that the server used in block 704. The new authentication code is a function of a combination of the particular local key and the client state information that is contained in the decrypted information.

In block 716, the server determines whether the new authentication code matches the authentication code that is contained in the decrypted information. If the authentication codes match, then control passes to block 718. If the authentication codes do not match, then control passes to block 720. In this manner, the server authenticates the information contained in the decrypted information.

In block 718, by comparing a current time value to the time value contained in the decrypted information, the server determines whether the client state information contained in the decrypted information has expired. If the current time value is less than the time value contained in the decrypted information, then control passes to block 722. If the current time value is not less than the time value contained in the decrypted information, then control passes to block 724.

In block 720, the server rejects the encrypted information that was received from the client. The server may reject all subsequent data sent from the client.

The client may derive one or more session keys from the shared secret key. Using such a session key, the client may encrypt a message and send the encrypted message to the server. In block 722, the server receives, from the client, a message that has been encrypted using a derived key that was derived from the shared secret key.

The client state information that is contained in the decrypted information includes the shared secret key. In block 724, the server derives, from the shared secret key, one or more session keys.

In block 726, using such a session key, the server decrypts the encrypted message that was sent from the client. Using a session key derived from the shared secret key, the server may encrypt another message and send that encrypted message back to the client. Thus, using the session keys derived from the shared secret key, the client and the server may encrypt and decrypt messages that they communicate to each other, thereby establishing a secure "tunnel."

After the client and the server are finished communicating, the server may free the server's memory that stored the client's state information, both in plain and in encrypted forms. Thus, the server may avoid storing client state information, including shared secret keys, on more than a merely temporary, non-continuous basis.

The approach described above with reference to flow diagram 700 may be used relative to multiple ones of clients 110A-N and clients 112A-N. Each of a plurality of clients may send, to a given server, encrypted information that contains a shared secret key for that client. Each client's shared secret key differs from each other client's shared secret key.

4.0 Implementation Mechanisms—Hardware Overview

Figure 8:
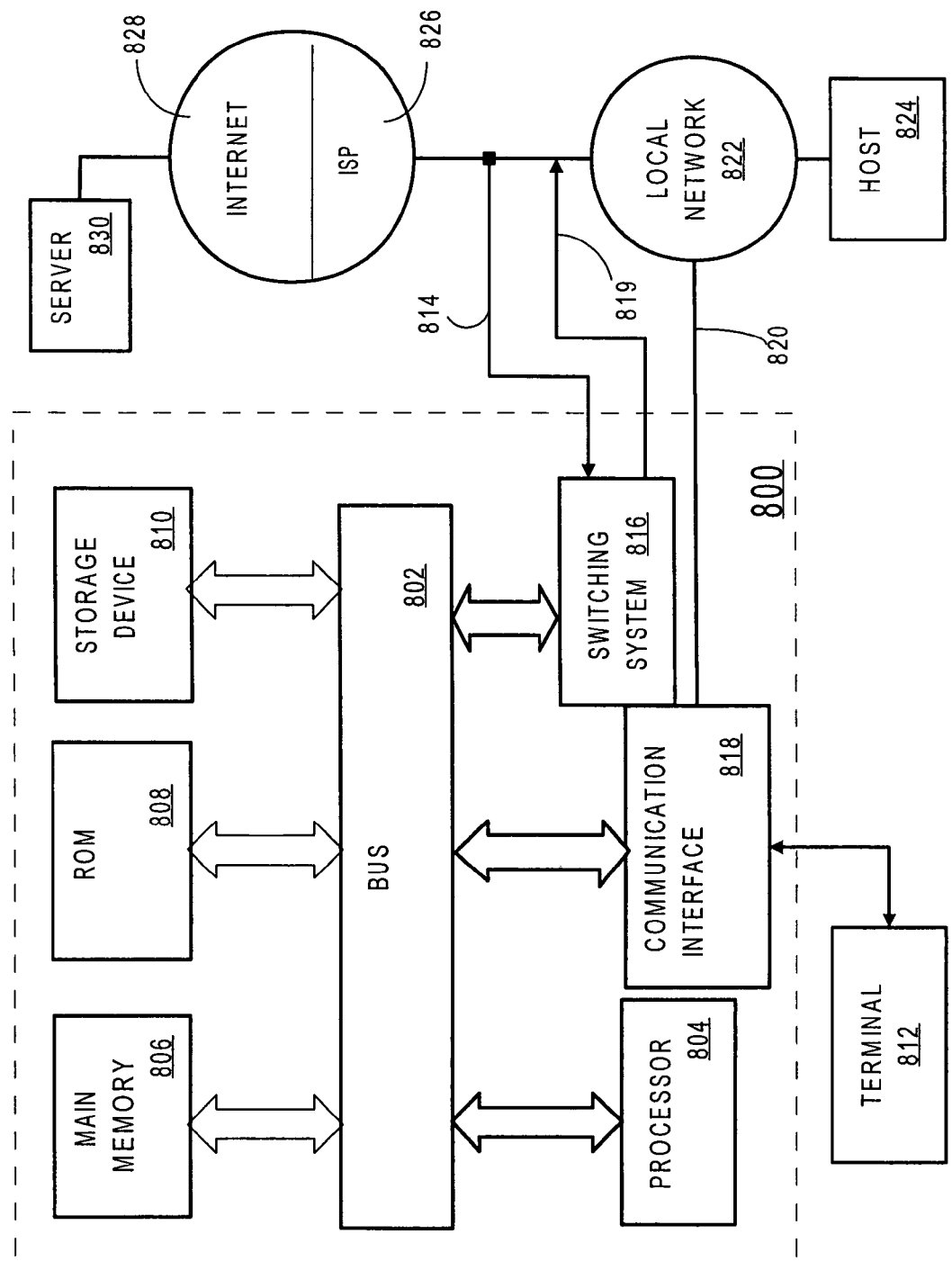
FIG. 8 is a block diagram that illustrates a computer system upon which an embodiment may be implemented.

FIG. 8 is a block diagram that illustrates a computer system 800 upon which an embodiment of the invention may be implemented. The preferred embodiment is implemented using one or more computer programs running on a network element such as a router device. Thus, in this embodiment, the computer system 800 is a router.

Computer system 800 includes a bus 802 or other communication mechanism for communicating information, and a processor 804 coupled with bus 802 for processing information. Computer system 800 also includes a main memory 806, such as a random access memory (RAM), flash memory, or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk, flash memory or optical disk, is provided and coupled to bus 802 for storing information and instructions.

A communication interface 818 may be coupled to bus 802 for communicating information and command selections to processor 804. Interface 818 is a conventional serial interface such as an RS-232 or RS-422 interface. An external terminal 812 or other computer system connects to the computer system 800 and provides commands to it using the interface 814. Firmware or software running in the computer system 800 provides a terminal interface or character-based command interface so that external commands can be given to the computer system.

A switching system 816 is coupled to bus 802 and has an input interface 814 and an output interface 819 to one or more external network elements. The external network elements may include a local network 822 coupled to one or more hosts 824, or a global network such as Internet 828 having one or more servers 830. The switching system 816 switches information traffic arriving on input interface 814 to output interface 819 according to pre-determined protocols and conventions that are well known. For example, switching system 816, in cooperation with processor 804, can determine a destination of a packet of data arriving on input interface 814 and send it to the correct destination using output interface 819. The destinations may include host 824, server 830, other end stations, or other routing and switching devices in local network 822 or Internet 828.

The invention is related to the use of computer system 800 for avoiding the storage of client state on computer system 800. According to one embodiment of the invention, computer system 800 provides for such updating in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector coupled to bus 802 can receive the data carried in the infrared signal and place the data on bus 802. Bus 802 carries the data to main memory 806, from which processor 804 retrieves and executes the instructions. The instructions received by main memory 806 may optionally be stored on storage device 810 either before or after execution by processor 804.

Communication interface 818 also provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for avoiding the storage of client state on a server as described herein.

Processor 804 may execute the received code as it is received and/or stored in storage device 810 or other nonvolatile storage for later execution. In this manner, computer system 800 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus, comprising:
a network interface that is coupled to a data network for receiving or transmitting one or more packet flows;
a processor coupled to the network interface;
one or more stored sequences of instructions which, when executed by the processor, cause the processor to perform:
based on a local key that is not known to a first client, encrypting first client state information to produce first encrypted information, wherein the first client state information includes authorization information;
receiving, at a first time, from the first client, both the first encrypted information and a first request;
based on the local key, decrypting the first encrypted information that was received from the first client, thereby producing first decrypted information;
determining, based on authorization information that was included in the first decrypted information, whether the first request is authorized; and
satisfying the first request only if the first request is authorized;
wherein the apparatus is a first computer and wherein the first client is implemented by a second computer and is communicatively coupled with the first computer.

2. An apparatus as recited in claim 1, wherein the sequences of instructions further comprise instructions which, when executed by the processor, cause the processor to perform:
removing the first client state information from memory before the first time; and
removing the first encrypted information from memory before the first time.

3. An apparatus as recited in claim 1, wherein the sequences of instructions further comprise instructions which, when executed by the processor, cause the processor to perform:
based on the local key, encrypting second client state information to produce second encrypted information, wherein the second client state information includes authorization information that differs from authorization information that was included in the first client state information;
sending the second encrypted information to the first client;
receiving, from the first client, both the second encrypted information and a second request;
based on the local key, decrypting the second encrypted information that was received from the first client, thereby producing second decrypted information;
determining, based on authorization information that was included in the second decrypted information, whether the second request is authorized; and
satisfying the second request only if the second request is authorized.

4. An apparatus as recited in claim 1, wherein the sequences of instructions further comprise instructions which, when executed by the processor, cause the processor to perform:
based on the local key, encrypting second client state information to produce second encrypted information, wherein the second client state information includes authorization information that differs from authorization information that was included in the first client state information;
sending the second encrypted information to the first client;
receiving, at a second time, from the first client, the first encrypted information, the second encrypted information, and a second request;
based on the local key, decrypting the second encrypted information that was received from the first client, thereby producing second decrypted information;
based on the local key, decrypting the first encrypted information that was received from the first client at the second time, thereby producing third decrypted information;
determining, based on both authorization information that was included in the second decrypted information and authorization information that was included in the third decrypted information, whether the second request is authorized; and
satisfying the second request only if the second request is authorized.

5. An apparatus as recited in claim 1, wherein the sequences of instructions further comprise instructions which, when executed by the processor, cause the processor to perform:
before sending the first encrypted information to the first client, calculating a first authentication code based on both the local key and the first client state information; and sending the first encrypted information and the first authentication code to the first client.

6. An apparatus as recited in claim 5, wherein the sequences of instructions further comprise instructions which, when executed by the processor, cause the processor to perform:
  after decrypting the first encrypted information that was received from the first client, calculating a second authentication code based on both the local key and client state information that was included in the first decrypted information; and
  determining whether the second authentication code matches an authentication code that was included in the first decrypted information.

7. An apparatus as recited in claim 6, wherein the first client state information includes a value that uniquely identifies the first client.

8. An apparatus as recited in claim 1, wherein the sequences of instructions further comprise instructions which, when executed by the processor, cause the processor to perform:
  before sending the first encrypted information to the first client, encrypting a first time value along with the first client state information to produce the first encrypted information.

9. An apparatus as recited in claim 8, wherein the sequences of instructions further comprise instructions which, when executed by the processor, cause the processor to perform:
  after decrypting the first encrypted information that was received from the first client, determining, based on both a second time value and a time value that was included in the first decrypted information, whether the first client state information has expired.

10. An apparatus as recited in claim 9, wherein the sequences of instructions further comprise instructions which, when executed by the processor, cause the processor to perform:
  selecting the local key from among a plurality of keys, wherein each key in the plurality of keys is associated with a different index value; and
  sending, to the first client, an index value that is associated with the local key.

11. An apparatus as recited in claim 10, wherein the sequences of instructions further comprise instructions which, when executed by the processor, cause the processor to perform:
  receiving, from the first client, the index value that is associated with the local key; and
  decrypting the first encrypted information based on a key that is associated with an index value that was received from the first client.

12. An apparatus as recited in claim 1, wherein the sequences of instructions further comprise instructions which, when executed by the processor, cause the processor to perform:
  based on the local key, encrypting second client state information to produce second encrypted information, wherein the second client state information includes authorization information that differs from the authorization information included in the first client state information, and wherein the local key is not known to a second client that differs from the first client;
  sending the second encrypted information to the second client;
  receiving, from the second client, both the second encrypted information and a second request;
  based on the local key, decrypting the second encrypted information that was received from the second client, thereby producing second decrypted information;
  determining, based on authorization information that was included in the second decrypted information, whether the second request is authorized; and
  satisfying the second request only if the second request is authorized.

13. An apparatus, comprising:
  a network interface that is coupled to a data network for receiving or transmitting one or more packet flows;
  a processor coupled to the network interface;
  one or more stored sequences of instructions which, when executed by the processor, cause the processor to perform:
    receiving, at a first time, from a first server, first encrypted information, wherein the first encrypted information is produced by encrypting first client state information based on a first key that is not known to a client;
    sending, at a second time, to the first server, both the first encrypted information and a first request; and
    receiving, at a third time, from the first server, a first response to the first request;
  wherein a first computer implements the client and wherein the first server is implemented by a second computer and is communicatively coupled with the client.

14. An apparatus as recited in claim 13, wherein the sequences of instructions further comprise instructions which, when executed by the processor, cause the processor to perform:
  storing the first encrypted information to memory after the first time; and
  retrieving the first encrypted information from memory before the second time.

15. An apparatus as recited in claim 13, wherein the sequences of instructions further comprise instructions which, when executed by the processor, cause the processor to perform:
  receiving, at a fourth time, from a second server, second encrypted information, wherein the second encrypted information is produced by encrypting second client state information based on a second key that is not known to the client, and wherein the second client state information includes second authorization information
  sending, at a fifth time, to the second server, both the second encrypted information and a second request; and
  receiving, at a sixth time, from the second server, a second response to the second request.

16. An apparatus as recited in claim 13, wherein the sequences of instructions further comprise instructions which, when executed by the processor, cause the processor to perform:
  receiving, at a fourth time, from a first server, second encrypted information, wherein the second encrypted information is produced by encrypting second client state information based on a second key that is not known to the client, and wherein the second client state information includes second authorization information that differs from the first authorization information that was included in the first client state information;
  sending, at a fifth time, to the first server, both the second encrypted information and a second request; and
  receiving, at a sixth time, from the first server, a second response to the second request.

17. An apparatus as recited in claim 13, wherein the first client state information includes first authorization information.

18. A volatile or non-volatile computer-readable medium storing one or more sequences of instructions, which instructions, when executed by one or more processors, cause the one or more processors to carry out the steps of:
receiving, at a first time, from a first server, first encrypted information, wherein the first encrypted information is produced by encrypting first client state information based on a first key that is not known to a client;
sending, at a second time, to the first server, both the first encrypted information and a first request; and
receiving, at a third time, from the first server, a first response to the first request;
wherein a first computer implements the client and wherein the first server is implemented by a second computer and is communicatively coupled with the client.

19. A volatile or non-volatile computer-readable medium as recited in claim 18, wherein the sequences of instructions further comprise instructions which, when executed by the processor, cause the processor to carry out the step of:
storing the first encrypted information to memory after the first time; and
retrieving the first encrypted information from memory before the second time.

20. A volatile or non-volatile computer-readable medium as recited in claim 18, wherein the sequences of instructions further comprise instructions which, when executed by the processor, cause the processor to carry out the step of:
receiving, at a fourth time, from a second server, second encrypted information, wherein the second encrypted information is produced by encrypting second client state information based on a second key that is not known to the client, and wherein the second client state information includes second authorization information
sending, at a fifth time, to the second server, both the second encrypted information and a second request; and
receiving, at a sixth time, from the second server, a second response to the second request.

21. A volatile or non-volatile computer-readable medium as recited in claim 18, wherein the sequences of instructions further comprise instructions which, when executed by the processor, cause the processor to carry out the step of:
receiving, at a fourth time, from a first server, second encrypted information, wherein the second encrypted information is produced by encrypting second client state information based on a second key that is not known to the client, and wherein the second client state information includes second authorization information that differs from the first authorization information that was included in the first client state information;
sending, at a fifth time, to the first server, both the second encrypted information and a second request; and
receiving, at a sixth time, from the first server, a second response to the second request.

22. A volatile or non-volatile computer-readable medium as recited in claim 18, wherein the first client state information includes first authorization information.

23. A method, comprising:
receiving, at a first time, from a first server, first encrypted information, wherein the first encrypted information is produced by encrypting first client state information based on a first key that is not known to a client, and wherein the first client state information includes first authorization information;
sending, at a second time, to the first server, both the first encrypted information and a first request; and
receiving, at a third time, from the first server, a first response to the first request;
wherein a first computer implements the client and wherein the first server is implemented by a second computer and is communicatively coupled with the client.

24. A method as recited in claim 23, further comprising:
storing the first encrypted information to memory after the first time; and
retrieving the first encrypted information from memory before the second time.

25. A method as recited in claim 23, further comprising:
receiving, at a fourth time, from a second server, second encrypted information, wherein the second encrypted information is produced by encrypting second client state information based on a second key that is not known to the client, and wherein the second client state information includes second authorization information
sending, at a fifth time, to the second server, both the second encrypted information and a second request; and
receiving, at a sixth time, from the second server, a second response to the second request.

26. A method as recited in claim 23, further comprising:
receiving, at a fourth time, from a first server, second encrypted information, wherein the second encrypted information is produced by encrypting second client state information based on a second key that is not known to the client, and wherein the second client state information includes second authorization information that differs from the first authorization information that was included in the first client state information;
sending, at a fifth time, to the first server, both the second encrypted information and a second request; and
receiving, at a sixth time, from the first server, a second response to the second request.

27. An apparatus, comprising:
means for receiving, at a first time, from a first server, first encrypted information, wherein the first encrypted information is produced by encrypting first client state information based on a first key that is not known to a client, and wherein the first client state information includes first authorization information;
means for sending, at a second time, to the first server, both the first encrypted information and a first request; and
means for receiving, at a third time, from the first server, a first response to the first request;
wherein a first computer implements the client and wherein the first server is implemented by a second computer and is communicatively coupled with the client.

28. An apparatus as recited in claim 27, further comprising:
means for storing the first encrypted information to memory after the first time; and
means for retrieving the first encrypted information from memory before the second time.

29. An apparatus as recited in claim 27, further comprising:
means for receiving, at a fourth time, from a second server, second encrypted information, wherein the second encrypted information is produced by encrypting second client state information based on a second key that is not known to the client, and wherein the second client state information includes second authorization information
means for sending, at a fifth time, to the second server, both the second encrypted information and a second request; and
means for receiving, at a sixth time, from the second server, a second response to the second request.

30. An apparatus as recited in claim 27, further comprising:
means for receiving, at a fourth time, from a first server, second encrypted information, wherein the second encrypted information is produced by encrypting second client state information based on a second key that is not known to the client, and wherein the second client state information includes second authorization information that differs from the first authorization information that was included in the first client state information;

means for sending, at a fifth time, to the first server, both the second encrypted information and a second request; and means for receiving, at a sixth time, from the first server, a second response to the second request.

* * * * *